W. E. BRUCE.
MOTOR DRIVEN VEHICLE.
APPLICATION FILED JAN. 8, 1917.
1,242,319.
Patented Oct. 9, 1917.
2 SHEETS—SHEET 1.
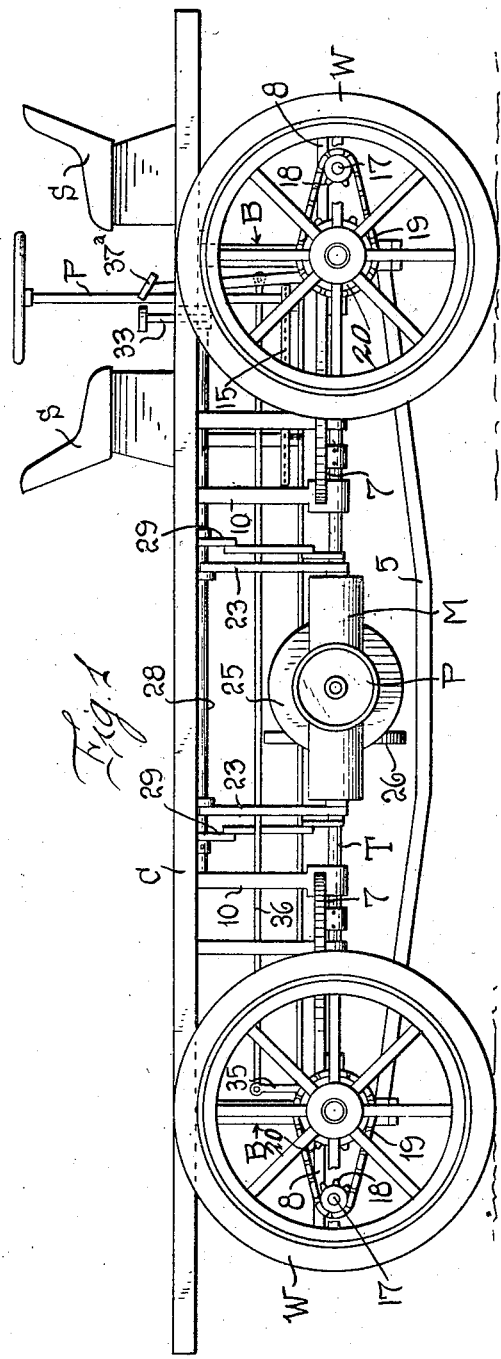
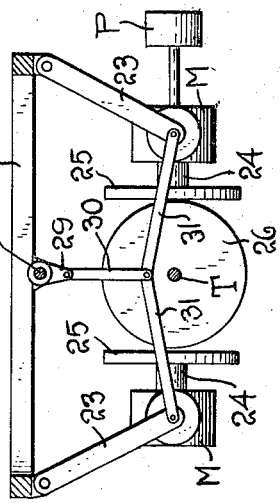
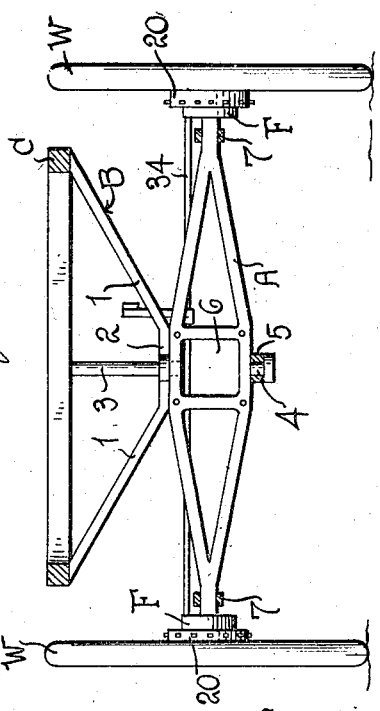
Inventor
W. E. BRUCE
By Watson E. Coleman
Attorney

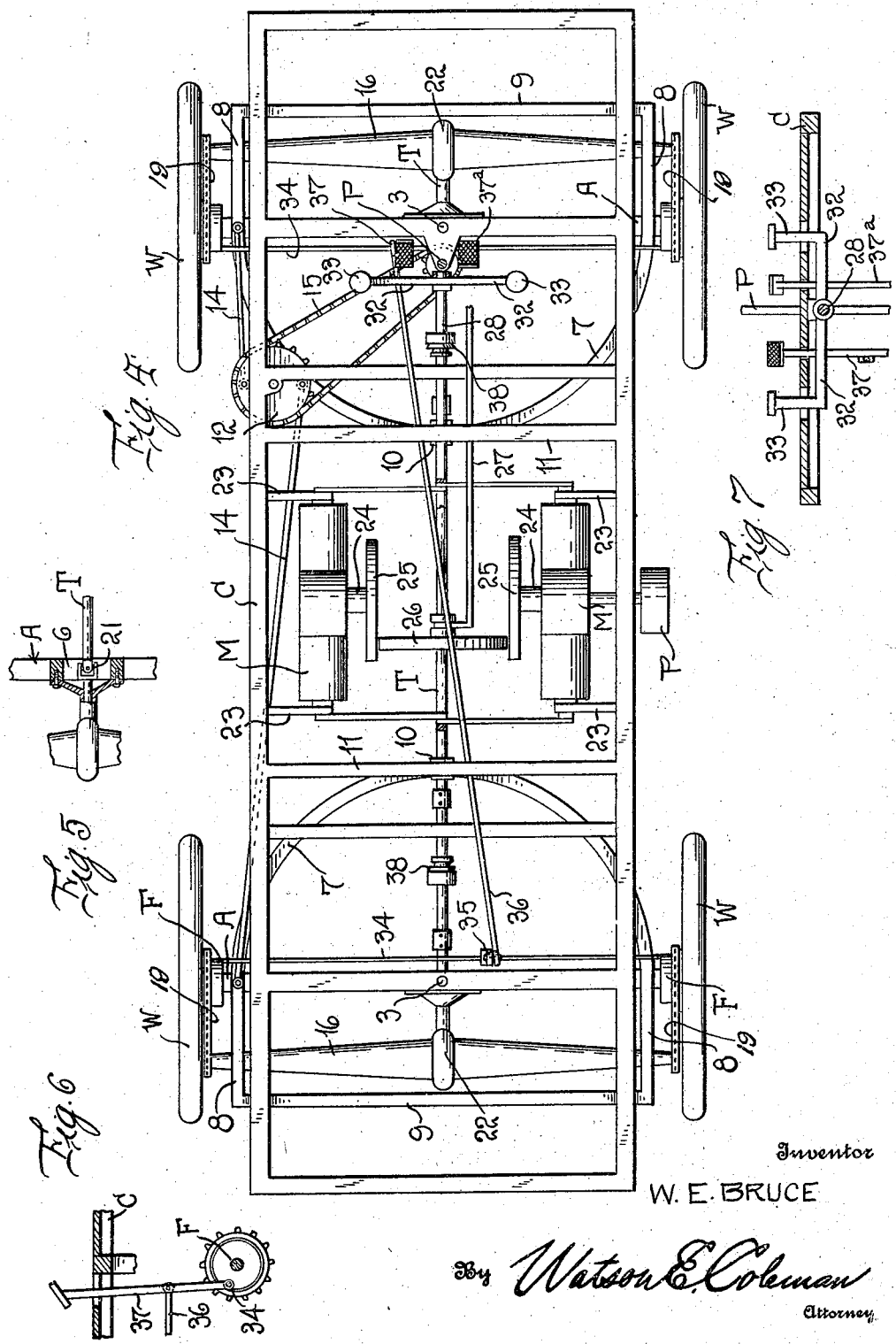

UNITED STATES PATENT OFFICE.

WILLIAM E. BRUCE, OF SUMMERFIELD, OHIO.

MOTOR-DRIVEN VEHICLE.

1,242,319.  Specification of Letters Patent.  Patented Oct. 9, 1917.

Application filed January 8, 1917. Serial No. 141,249.

*To all whom it may concern:*

Be it known that I, WILLIAM E. BRUCE, a citizen of the United States, residing at Summerfield, in the county of Noble and State of Ohio, have invented certain new and useful Improvements in Motor-Driven Vehicles, of which the following is a specification, reference being had to the accompanying drawings.

This invention relates to certain improvements in motor-driven vehicles and it is an object of the invention to provide novel and improved means for transmitting power to the driving wheels of the vehicle.

It is also an object of the invention to provide a device of this general character wherein the chassis or frame of the vehicle is mounted upon wheel-supported axles and wherein said axles are capable of swinging movement for controlling the direction of travel of the vehicle together with means for imparting the requisite movement to the axles.

The invention has for a still further object to provide a device of this general character wherein the rotation of the wheels may be readily and effectively controlled.

The invention consists in the details of construction and in the combination and arrangement of the several parts of my improved vehicle whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is a view in side elevation illustrating a motor-driven vehicle constructed in accordance with an embodiment of my invention;

Fig. 2 is a transverse sectional view taken through the rear portion of the vehicle as herein embodied, certain of the parts being in elevation;

Fig. 3 is a transverse vertical sectional view taken through a central portion of the vehicle as herein disclosed, certain of the parts being omitted for clarity in disclosure;

Fig. 4 is a view in top plan with portions broken away of the vehicle as herein embodied;

Fig. 5 is a fragmentary view partly in top plan and partly in section disclosing the universal joint as embodied in the transmission shaft;

Fig. 6 is a fragmentary view partly in elevation and partly in section illustrating a portion of the brake operating means as herein disclosed; and Fig. 7 is a fragmentary view partly in transverse section and partly in elevation illustrating the engine control and brake control as herein set forth.

As disclosed in the accompanying drawings, C denotes the chassis or frame of my improved motor-driven vehicle as herein embodied, said frame being preferably rectangular in form and provided at predetermined points inwardly of its opposite ends with the bolsters B.

As is particularly illustrated in Fig. 2, each of the bolsters B comprises the inwardly and downwardly inclined arms 1 having their lower end portions connected by the intermediate straight portion 2 substantially parallel to the transverse diameter of the chassis or frame C, and interposed between the chassis C and the portion 2 of the bolsters B is the vertical pin 3 which extends below the portion 2 and serves as a mounting for an axle A.

In vertical alinement with the pin 3, the axle A, when in applied position, is provided with the depending stud or trunnion 4 with which is suitably engaged an end portion of the longitudinally disposed truss beam or reinforcing bar 5 for a purpose which is believed to be clearly apparent to those skilled in the art to which my invention appertains.

As is also particularly illustrated in Figs. 2 and 5, it is to be noted that the axle A has its central portion provided with the opening 6 for a purpose which will hereinafter be more particularly referred to.

Each of the axles A is provided with an inwardly directed arcuate bar 7 disposed on a radius about the pin 3 or more particularly the center of the axle, and said bar 7 has its end portions extended outwardly relative to the axle, said extended portions 8 being substantially in parallelism and at right angles to the axle. The outer extremities of the portions 8 are tied or connected by the bar or beam 9 arranged in parallelism with the axle A. The bar 7 serves in the nature of a fifth wheel and is slidably disposed through a post 10 depending from substantially the longitudinal center of a transverse beam 11 comprised in the chassis or frame C.

Rotatably supported by the chassis C adjacent a longitudinal margin of said chassis is the sprocket 12 movable about a vertical axis and which has pivotally engaged therewith at substantially diametrically opposed points the rods 14. The rods 14 are also pivotally engaged with the bars 7 whereby it will be perceived that upon rotation of the sprocket 12 the axles A will be swung in unison about their pivots but in opposite directions.

As herein disclosed, the sprocket 12 is operatively engaged through the medium of the chain 15 with the lower portion of the vertically disposed steering post P.

Supported by the portions 8 of each of the bars 7 is a casing 16 through which is disposed the shaft 17. The opposite end portions of the shaft 17 have fixed thereto the sprockets 18 operatively engaged through the medium of the chains 19 with the sprockets 20 carried by the adjacent wheels W mounted upon the end portions of the axles A.

Disposed longitudinally of the chassis or frame C at the transverse center thereof is the transmission shaft T which is disposed through the opening 6 in the axles A and is provided in vertical alinement with the pins 3 and studs 4 with the universal joints 21. The ends of the shaft T are operatively engaged, as indicated at 22, with the shafts 17. It will be at once self-evident that the universal joints 21 afford the requisite flexibility to said shaft T during the movement of the axles A about their pivots.

Depending from the chassis or frame C and mounted for rocking movement transversely of said chassis or frame C are the arms 23 arranged in pairs at opposite sides of the shaft T. The lower ends of each pair of arms 23 are operatively engaged with the opposite end portions of a motor M preferably of an internal combustion type and which has its driving shaft 24 disposed inwardly and in perpendicular relation to the shaft T. The outer ends of the driving shafts 24 are provided with the friction disks 25 adapted to engage the periphery of the friction disk 26 keyed to the shaft T for rotation therewith but capable of longitudinal movement thereof.

As is particularly disclosed in Figs. 3 and 4, the motors M are in neutral position but it will be at once self-evident that upon said motors being moved inwardly to cause the disks 25 thereof to frictionally engage the disk 26, the requisite rotation will be imparted to the shaft T. It will also be clearly apparent to those skilled in the art to which my invention appertains that the speed of rotation of the shaft T may be readily controlled by the movement of the disk 26 longitudinally of the shaft T and that also the direction of travel of the shaft T may be reversed if required.

Any conventional means may be employed for imparting the requisite movement to the disk 26 longitudinally of the shaft T as is indicated at 27 in Fig. 4 of the drawings.

Extending longitudinally of the chassis or frame C above the shaft T but in vertical alinement therewith is a rock shaft 28 provided with the depending rock arms 29 with each of which is pivotally engaged the link 30. The lower end of the link 30 has pivotally engaged therewith the links or levers 31 which are also pivotally engaged with the adjacent ends of the motors M. It is to be understood that the links 30 and 31 are rigid so that when the arms 29 are moved in a position away from the vertical the motor M will be swung inwardly toward the shaft T to effect the requisite coaction between the disks 25 and 26 and vice versa.

An end portion of the shaft 28 is provided with the oppositely directed arms 32 terminating in the upstanding foot pedals 33 and whereby convenient means are afforded for imparting the requisite rocking movement to the shaft 28. It is to be noted that the pedals 33 are positioned at opposite sides of the post P so that one of said pedals may be readily engaged with the right foot of the operator irrespective of which end of the vehicle he may be facing.

As is particularly disclosed in Fig. 1, it is to be noted that the seats S are oppositely disposed and face each other. This is done to obviate the necessity of having to turn the vehicle completely around when it is desired to return. It is thought to be self-evident that in order to have a return travel it is only necessary for the operator to change from one seat S to the other. This is particularly desirable when my improved vehicle is employed as a tractor.

Coacting with each of the wheels W is a friction brake mechanism F and coacting with the expanding cams of the mechanism F of each axle A is a rod 34 which serves to cause said expanding cams to operate in unison.

Extending upwardly from one rod 34 is a rock arm 35 with which is operatively engaged a rod 36 extending longitudinally of the chassis or frame C and operatively engaged with the upstanding operating lever 37 engaged with the second rod 34. It is thought to be self-evident that the rod 36 serves to cause the rods 34 to move in unison and in the same general direction so that the brake mechanism F coacting with each of the wheels W will be caused to operate in unison. I also find it of advantage to provide the last named rod 34 with a second operating lever 37ª. The operating levers 37 and 37ª are also positioned at opposite sides of the post P for a purpose which is believed to be clearly apparent.

From the foregoing description, it is thought to be obvious that a vehicle constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

It has also been found of advantage to have the shaft T formed of a plurality of sections, the adjacent end portions of which being provided with the clutch members 38 of any ordinary or preferred type, whereby it will be at once self-evident that the forward or rear wheels or both may be arranged idle when required without the necessity of adjusting the motors M.

It has also been found of advantage to provide one of the motors M with a pulley P so that said motor may be used with convenience and facility to drive machinery of differing types and especially of a character employed in farm work.

I claim:

1. A device of the character described comprising a wheel-supported frame, a transmission shaft operatively engaged with the wheels, a friction disk keyed to said transmission shaft and capable of movement longitudinally thereof, motors suspended from the frame for rocking movement transversely of the frame and positioned at opposite sides of the transmission shaft, each of said motors including a friction disk engageable with the disk of the transmission shaft, and means for moving the motors in a direction toward or from the transmission shaft.

2. A device of the character described comprising a frame, supporting axles co-acting with the opposite end portions of the frame, a transmission shaft operatively engaged with the supporting axles, means engageable with the transmission shaft substantially midway the length thereof for driving the shaft, said transmission shaft being formed of a plurality of sections, and clutch members co-acting with adjacent end portions of the sections at opposite sides of the driving means of the shaft whereby said supporting axles may be positively driven in unison, or one of said axles driven independently of the other.

In testimony whereof I hereunto affix my signature in the presence of two witnesses.

WILLIAM E. BRUCE.

Witnesses:
R. E. HORTON,
F. M. CALLAND.

Copies of this patent may be obtained for five cents each, by addressing the "Commissioner of Patents, Washington, D. C."